United States Patent [19]

van Raalte et al.

[11] 4,341,437

[45] Jul. 27, 1982

[54] STYLUS TIP POSITIONING TECHNIQUE

[75] Inventors: John A. van Raalte, Princeton; David W. Fairbanks, Monmouth Junction, both of N.J.

[73] Assignee: RCA Corporation, New York, N.Y.

[21] Appl. No.: 202,120

[22] Filed: Oct. 30, 1980

[51] Int. Cl.³ .............................................. G02B 7/00
[52] U.S. Cl. ......................................... 350/81; 350/90
[58] Field of Search ....................... 350/81, 86, 89, 90, 350/238, 239; 356/244

[56] References Cited

U.S. PATENT DOCUMENTS 3,687,557 8/1972 Odhner ............................ 350/90 X
3,738,730 6/1973 Binnings et al. ...................... 350/90

FOREIGN PATENT DOCUMENTS 841673 7/1960 United Kingdom ................. 350/238
947185 1/1964 United Kingdom ................... 350/90

OTHER PUBLICATIONS

Upit et al., "MIM-8 Microscope Attachment...", Ind. Lab. (USA) vol. 44, No. 2, pp. 257-258, 1978.

Primary Examiner—John K. Corbin
Assistant Examiner—Matthew W. Koren
Attorney, Agent, or Firm—Birgit E. Morris; Donald S. Cohen; Thomas H. Magee

[57] ABSTRACT

A technique for positioning the tip of a stylus mounted on an arm attached to a cartridge for viewing through a microscope comprises a platform having a transparent plate attached thereto. The platform is adapted to support the cartridge so that the tip of the stylus contacts a surface of a transparent plate disposed between the tip and an objective of the microscope, the plate being prepositioned so that the surface lies in the focal plane of the microscope objective. The tip of the stylus is moved in a direction along the surface of the plate so that the stylus tip is centered within the field of view of the microscope objective. In order to guide the tip, the surface of the plate may have two raised ledges thereon, intersecting at a vertex centered within the field of view of the microscope objective.

27 Claims, 3 Drawing Figures

STYLUS TIP POSITIONING TECHNIQUE

This invention relates to a technique for positioning the tip of a stylus mounted on an arm attached to a cartridge, in order that the tip may be viewed through a microscope objective.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems the stylus is typically made from natural or synthetic diamond by several critical shaping and lapping processes, normally referred to as micromachining. The stylus tip is tapered to form the prow of the tip, and is also lapped to form a keel having a V-shaped shoe for its bottom portion. This keel-shaped tip has a shoe length of about 3 to 5 micrometers and a thickness of about 2 micrometers. These micromachining steps are normally performed while the stylus is mounted on an arm attached to a cartridge, wherein the arm is capable of flexible movement with respect to the cartridge.

In manufacturing stylus tips for use in such video disc playback systems, after each micromachining step the tip of the diamond stylus is inspected with a high-power optical microscope having 1000× to 1500× magnification. Since the stylus tip is about 2×5 micrometers in size and the depth of focus of the microscope is about 1 micrometer, the problem of locating the stylus tip in the field of view of the microscope is severe. Untrained operators may require more than 1 hour to perform this task, while even highly skilled operators still require ½ to 1 minute normally. Moreover, there is considerable danger that the sharp stylus tip will accidentally touch the high-power microscope objective, thereby ruining an expensive element.

The system described below is intended to simplify the stylus inspection technique, while also avoiding the danger of accidentally damaging the microscope objective. Another advantage is the fact that oil-immersion optics can be used to give better, brighter, higher-resolution images of the stylus tip while avoiding the need to frequently clean and reoil the microscope objective. The present invention provides a novel method and apparatus for rapidly positioning the tip of a stylus mounted on a flexible arm attached to a cartridge.

SUMMARY OF THE INVENTION

The present invention comprises a technique for positioning the tip of a stylus, mounted on an arm attached to a cartridge, for viewing through a microscope. A platform having a transparent plate attached thereto is adapted to support the cartridge so that the tip of the stylus contacts a surface of the transparent plate disposed between the tip and an objective of the microscope, the plate being prepositioned so that the surface lies in the focal plane of the microscope objective. The tip of the stylus is moved in a direction along the surface of the plate so that the stylus tip is centered within the field of view of the microscope objective. In order to guide the tip, the surface of the plate may have two raised ledges thereon, intersecting at a vertex centered within the field of view of the microscope objective. In the present embodiment, the moving step is performed by moving the cartridge substantially parallel to the surface in a manner such that the tip of the stylus meets one of the raised ledges and slides therealong toward the vertex until stopped thereat.

DETAILED DESCRIPTION OF THE PREFERRED EMBODIMENT

Figure 1:
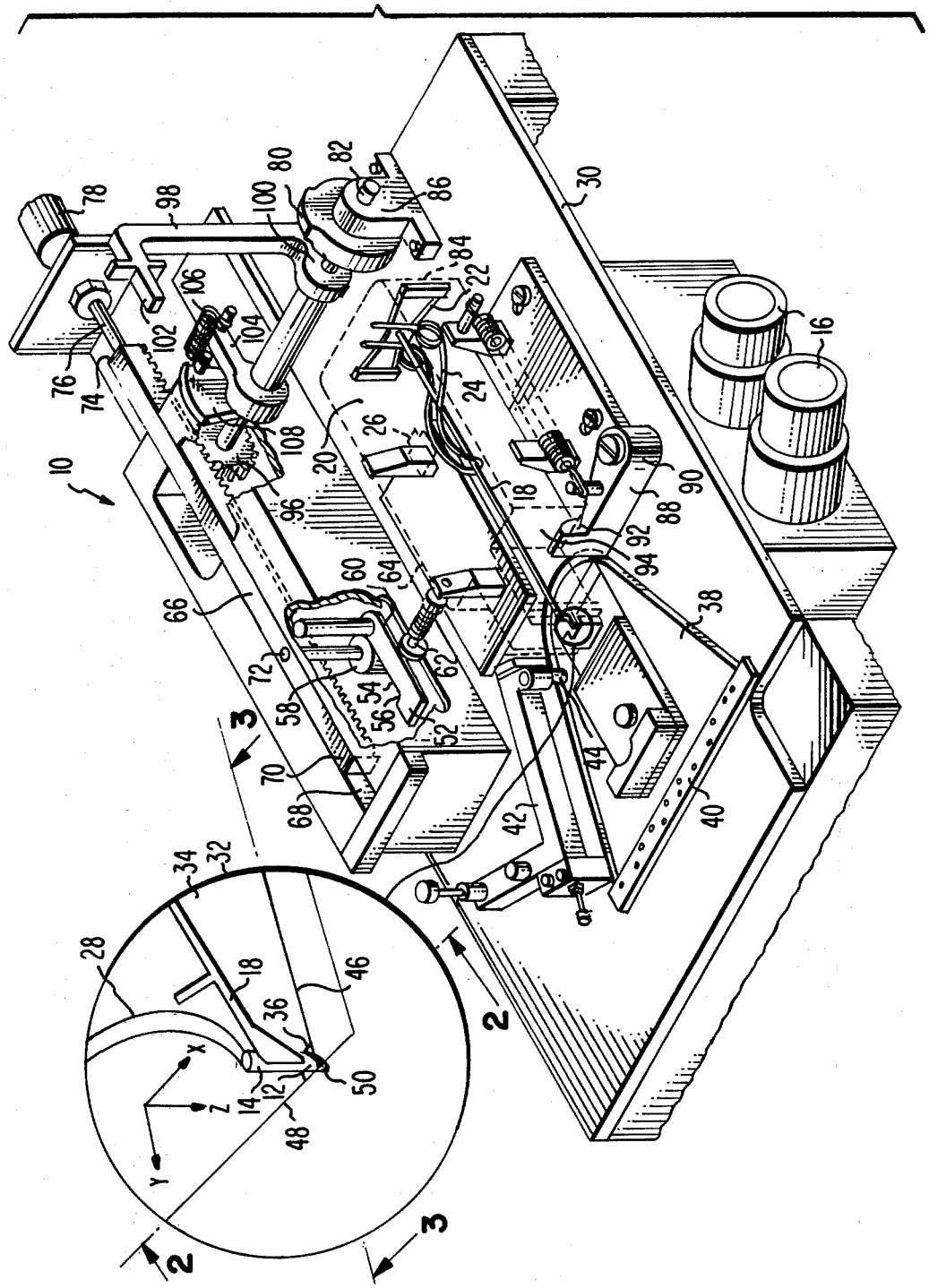
FIG. 1 is a perspective view, partially in crosssection, illustrating the apparatus of the present novel invention.

In FIG. 1 of the drawing, there is shown one embodiment of an apparatus 10 utilized for positioning the tip 12 of a stylus 14 for viewing through a microscope 16. The stylus 14 is mounted on an arm 18 attached to a cartridge 20 in a manner such that the arm 18 is capable of flexible movement with respect to the cartridge 20. For a detailed description of a stylus arm mounted in a pickup cartridge, see U.S. Pat. No. 4,030,124 entitled VIDEO DISC PLAYBACK SYSTEM AND PICKUP CARTRIDGE THEREFOR, issued to J. A. Allen on June 14, 1977, and assigned to RCA Corporation, which is incorporated herein by reference. In this example, the arm 18 is suspended within the body of the cartridge 20 by means of a flexible diaphragm 22 supported within the cartridge 20, which is attached to the end of the arm 18 opposite the end holding the stylus 14. A U-shaped clamping spring 24 releasably clamps the arm 18 in a retracted position in the cartridge 20. In the present embodiment, the cartridge 20 has an opening 26 in the top thereof through which a spring defeat lever may enter the interior of the cartridge 20 and depress the clamping spring 24, thereby allowing the arm 18 to lower the stylus 14, which is guided by a conductive leaf spring 28 secured thereto.

Figure 2:
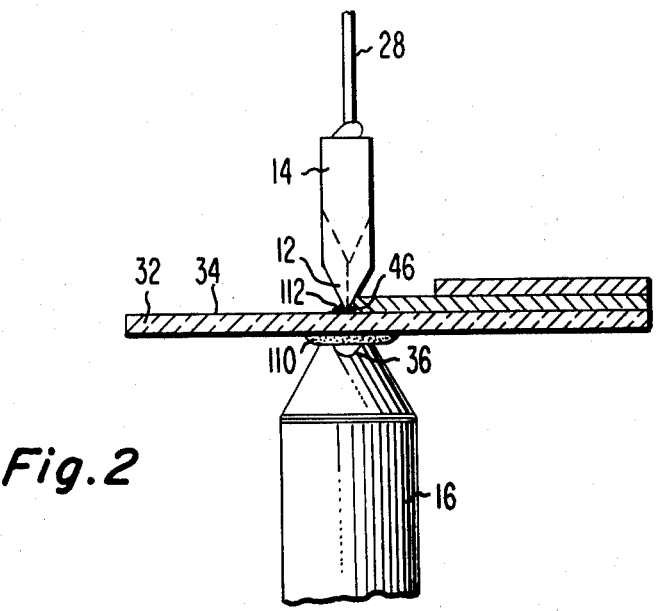
FIG. 2 is a partial cross-sectional view taken along line 2—2 of FIG. 1.

The positioning apparatus 10 comprises a platform 30 having a transparent plate 32 attached thereto. The platform 30 is adapted to hold the cartridge 20 so that the tip 12 of the stylus 14 may contact a surface 34 of the transparent plate 32 disposed between the tip 12 and an objective 36 of the microscope 16, as shown in FIGS. 1 and 2. The plate 32 is prepositioned such that the surface 34 lies in the focal plane of the microscope objective 36. In order to allow the surface 34 to be positioned within focusing range without moving the entire platform 30, the transparent plate 32 is attached to the platform 30 in a manner such that the position of the plate 32 relative to the platform 30 may be easily adjusted. In the present embodiment, the plate 32 is attached to a separate portion 38 of the platform 30 supported by a resilient hinge 40, which allows the separate portion 38 to be raised or lowered slightly by means of an adjustment lever 42 having a contact rod 44 adjacent the separate portion 38, as illustrated in FIG. 1. Preferably, the transparent plate 32 comprises a thin cover glass having a thickness of about 100 micrometers.

The positioning apparatus 10 further comprises means attached to the platform 30 for moving the tip 12 of the stylus 14 in a direction along the surface 34 of the plate 32 so that the tip 12 is substantially centered within the field of view of the microscope objective 36. The apparatus 10 may have means attached to the plate 32 for guiding the tip 12 toward a vertex 50 centered within the field of view of the microscope objective 36.

Figure 3:
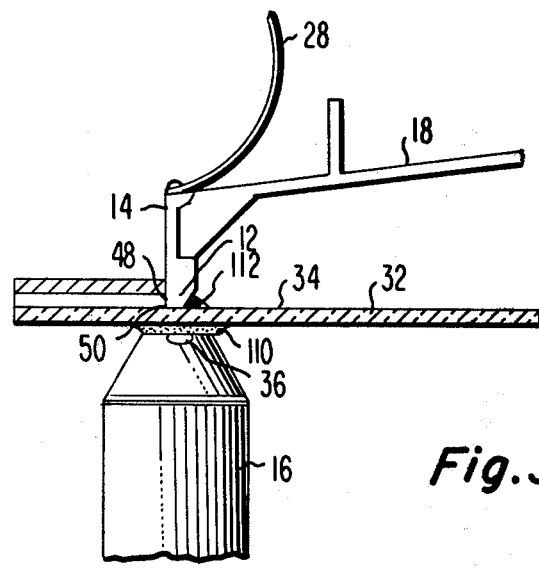
FIG. 3 is a partial cross-sectional view taken along line 3—3 of FIG. 1.

In the present embodiment, the surface 34 of the plate 32 has two raised ledges 46 and 48 thereof intersecting at the vertex 50 centered within the field of view of the microscope objective 36, as shown in FIGS. 2 and 3. In this embodiment, the moving means comprises means for moving the cartridge 20 substantially parallel to the surface 34 in a manner such that the tip 12 meets the raised ledge 46 and slides therealong toward the vertex 50 until stopped thereat by the raised ledge 48. The raised ledges 46 and 48 may comprise the edges of two rectangular metallic sheets juxtaposed to form a vertex 50, and held in place above the plate 32 by an overlying L-shaped sheet which has one leg of the L set back from the ledge 46 in order to provide sufficient freedom to allow the angled side of the tip 12 to slide along the edge 46, and thereby keep the bottom of the tip 12 in close proximity to the edge 46, as shown in FIG. 3. Since the stylus 14 is mounted flexibly in the cartridge 20 in both the x and y directions (the arm 18 can move in both directions), this L-shaped guide can be arranged so that all styli, regardless of initial position, end up within the field of view of the microscope objective 36.

In the preferred embodiment, the means for moving the cartridge 20 comprises means for shoving the cartridge laterally along a first direction, i.e., the x direction in FIG. 1, and means for pushing the cartridge 20 forward along a second direction substantially orthogonal to the first direction, i.e., the y direction in FIG. 1. The shoving means comprises a sliding cam lever 52 having an edge 54 with an inclined step 56. The edge 54 is oriented substantially along the second direction (y direction) and disposed adjacent a roller 58 connected to means for guiding the roller 58 along the second direction. The edge 60 opposite the stepped edge 54 is disposed adjacent a pin 62 adapted to contact one side 64 of the cartridge 20 and shove the cartridge 20 laterally, when the roller 58 moves forward along the second direction adjacent the inclined step 56. This causes the cam lever 52 to turn, thereby moving the pin 62 along the first direction (x direction).

In the present embodiment, the means for guiding the roller 58 comprises a rack bar 66, adapted to move within a groove 68 disposed along the second direction (y direction). The bar 66 has one end 70 thereof connected to an axle 72 on which the roller 58 rotates, and has a second end 74 thereof attached to a piston rod 76 of an air cylinder 78. The piston rod 76, which is driven by the air cylinder 78, is adapted to move the rack bar 66 along the groove 68.

The pushing means comprises a cam lobe 80 attached to a shaft 82 oriented along the first direction (x direction) and connected to means for rotating the shaft 82. The cam lobe 80 is designed to contact one end 84 of the cartridge 20 and push the cartridge 20 forward when the shaft 82 is rotated within a housing 86. Preferably, the apparatus 10 further comprises a spring lever 88 having one end 90 thereof attached to the platform 30 and the other end 92 adapted to contact the end 94 of the cartridge 20 opposite the one end 84 and thereby hold the one end 84 firmly against the cam lobe 80. In FIG. 1, the means for rotating the shaft 82 comprises a pinion 96 affixed to the shaft 82 and geared to the rack bar 66. The movement of the rack bar 66 within the groove 68 causes the pinion 96 and shaft 82 to rotate.

In the present embodiment, the apparatus 10 further comprises a mechanical depressor 98 attached to the shaft 82 and adapted to depress the clamping spring 24, thereby lowering the arm 18 until the tip 12 of the stylus 14 contacts the surface 34 of the plate 32. One end 100 of the mechanical depressor 98 is rotatably mounted on the shaft 82 in a manner such that, upon rotation thereof, the opposite end 102 of the depressor 98 contacts and lowers the clamping spring 24 through the cartridge opening 26. The depressor 98 is affixed to a first torque arm 104 attached by a torque spring 106 to a second torque arm 108 affixed to the shaft 82, so that the rotation of the shaft 82 then causes the depressor 98 to rotate. The torque spring 106 allows the shaft 82 to continue rotating after the depressor 98 has lowered the clamping spring 24 and become stationary.

The field of view of a typical 1000× microscope is ~8×8 mils (200×200 micrometers) by ~1 micrometer depth of field. Therefore, the most difficult stylus positioning step is to place it within the depth of focus. The present novel method of positioning the stylus tip 12 comprises placing the tip 12 of the stylus 14 in contact with the surface 34 of the transparent plate 32, which comprises a thin cover glass (100 micrometers thick) in the present embodiment. The cover glass 32 is prepositioned such that the surface 34 lies in the focal plane of the microscope objective 36. An index-matching liquid (having an index of refraction similar to the cover glass 32), such as a drop 110 of oil, is disposed between the oil-immersion objective 36 and the cover glass 32, and is used to avoid first-surface reflections at the underside of the cover glass 32.

The process of focusing on the upper surface 34 of the cover glass 32 is easily accomplished. By closing the diaphragm of the microscope illuminator to fill less than the full field of view, a reflection from this illumination aperture, reflected from the cover glass surface 34, can easily be seen when the microscope is focused on the surface 34.

Once the microscope 16 is focused on the upper glass surface 34, the focus adjustment remains fixed. When the stylus tip 12 is now placed in contact with the cover glass surface 34, as shown in FIGS. 2 and 3, the tip 12 is automatically in focus. A small drop 112 of oil or other liquid, such as glycerine, on the upper glass surface 34 will index-match that surface 34, thereby removing its reflections as well as providing a clear image of the stylus tip 12 in a dark field of view. In the present method, the placing step is performed by supporting the cartridge on the platform 30 in a manner such that the stylus 14 is located adjacent the surface 34 of the prepositioned glass plate 32. The arm 18 is then lowered with the leaf spring 28 when the mechanical depressor 98 lowers the clamping spring 24 until the stylus tip 12 contacts the glass surface 34. The cover glass 32 is thereby utilized to accomplish the most critical part of the positioning technique, i.e., alignment of the stylus tip in the z direction. At this point there remains the problem of locating the stylus tip 12 within the field of view of the microscope 16, i.e., alignment in the x and y directions.

In the present embodiment, the positioning method further comprises the step of moving the tip 12 of the stylus 14 in a direction along the surface 34 of the cover glass 32 so that the stylus tip 12 is substantially centered within the field of view of the microscope objective 36. This moving step is performed by moving the cartridge 20 substantially parallel to the surface 34 in a manner such that the stylus tip 12 meets the raised ledge 46 and slides therealong toward the vertex 50 until stopped thereat by the raised ledge 48. In the present example, the step of moving the cartridge 20 is performed by shoving the cartridge 20 laterally along the first direction (x direction), and then pushing the cartridge 20 forward along the second direction (y direction). In other words, while the stylus tip 12 is in virtual contact (except for the index-matching liquid 112) with the glass surface 34, the cartridge 20 is shoved laterally a distance sufficient to allow the tip 12 to come to rest against the side ledge 46, as shown in FIG. 2. The cartridge 20 is also pushed forward a distance sufficient to allow the tip 12 to come to rest against the front ledge 48, as shown in FIG. 3. Since the arm 18 is capable of a certain amount of flexible movement (both x and y directions) within the cartridge 20, the cartridge 20 may continue to move after the tip 12 is stopped, within the arm's flexible tolerance, without causing damage to the tip 12. After shoving and pushing the cartridge 20, the stylus tip 12 is positioned at the vertex 50, or the corner of the "L", as shown in FIG. 1. Since the vertex 50 is centered within the field of view of the microscope 16, the stylus tip 12 is now properly positioned for viewing through the microscope 16.

The present apparatus 10 is designed to incorporate the aforementioned shoving and pushing steps into a single automated action initiated by the movement of the air cylinder 78. The piston rod 76 of the cylinder 78 slides the rack bar 66 forward, causing the pinion 96 and shaft 82 to rotate. As the shaft 82 rotates, it causes the second torque arm 108 to rotate, which is connected by the torque spring 106 to the first torque arm 104. Since the first torque arm 104 is affixed to the mechanical depressor 98, the second torque arm 108 causes the depressor 98 to start to rotate, via the first torque arm 104 and the torque spring 106. Upon rotation of the depressor 98, the opposite end 102 of the depressor enters the cartridge opening 26 and contacts the clamping spring 24. The arm 18 is then lowered, causing the stylus tip 12 to contact the cover glass 32. When the depressor 98 meets resistance from the cartridge 20, the tension in the torque spring 106 is such that the shaft 82 may continue to rotate while the depressor 98 remains stationary. As the rack bar 66 slides forward, the roller 58 moves forward and contacts the inclined step 56 of the sliding cam lever 52, causing the lever 52 to turn toward the pin 62. The lever 52 pushes the pin 66 along the x direction so as to contact the one side 64 of the cartridge 20 and shove the cartridge 20 laterally. The continued rotation of the shaft 82 then causes the cam lobe 80 to contact the one end 84 of the cartridge 20 and push the cartridge 20 forward. After the stylus tip 12 is inspected, the shaft 82 then reverses its rotation sequence, so that the stylus 14 is raised and the apparatus 10 is ready for the next cartridge.

Although the present embodiment discloses two raised ledges 46 and 48 which intersect at the vertex 50 to form an L-shaped groove, the present invention encompasses other types of structures shaped to form a vertex so as to guide the sliding stylus tip 12 within the field of view of the microscope 16. For example, after first lowering the stylus tip 12 onto the cover glass 32 as described above, the x-y alignment may be achieved by pulling the cartridge 20 backward so that the stylus 14 is captured in a Y-shaped groove whose end point, at the neck of the "Y", is exactly above the microscope objective 36. Somewhat less sophisticated is a system that positions the stylus tip 12 in a groove and still requires a one-dimensional search of the microscope stage. Also, depending on the specific stylus/cartridge design, various types of knife edges could be used to push against the facets of the stylus tip 12 to place it in the field of view. If the stylus 14 is attached to the arm 18 with sufficient precision, the alignment fixture can also "grab" the arm 18 to minimize the chances of damaging the stylus 14 itself. In future designs where a smaller diamond stylus may be held in a cylindrical or precisely-dimensioned metal shank, a cone-like or funnel device may be used to guide the stylus tip 12 into the field of view while it is lowered onto the transparent plate 32. All of these variants are to some extent dependent upon the dimensional tolerances of the stylus itself and its attachment.

The present positioning technique has several advantages features. The micrometer dimensions of the stylus tip 12, the need to precisely control its shoe length, and the desire to "see" the $\sim$2000 angstrom thick metal electrode all make oil immersion very desirable. Normally, however, the oil must be replaced and the objective lens cleaned for every ten or so observations. In the present system the oil is trapped between the objective lens and cover glass and thus protected from dust. We have found that the same oil may remain in place and clean for one or more days. Also, the presence of oil on the stylus tip 12 is sometimes undesirable, e.g., when the micromachining steps are not complete. We have found that many other liquids, e.g., water with a suitable wetting agent, lens cleaning solution, and glycerine, also provide adequate index matches for the outer glass surface since the stylus tip 12 is essentially in contact with it. We have found that the clarity of the image is good enough to see the metal electrode on the stylus tip 12 as well as the shape of the keel shoulders and the electrodes on them. Also, the symmetry and alignment of the V-shaped shoe are easily checked in this system. All of these observations can be made in seconds by essentially untrained operators, and the chance of damaging the microscope objective 36 is eliminated.

What is claimed is:

1. A method of positioning the tip of a stylus mounted on an arm attached to a cartridge for viewing through a microscope, said arm being capable of flexible movement with respect to said cartridge, comprising the step of placing the tip of said stylus in contact with a surface of a transparent plate disposed between said tip and an objective of said microscope, said plate being prepositioned such that said surface lies in the focal plane of said microscope objective.

2. A method as recited in claim 1 further comprising moving the tip of said stylus in a direction along the surface of said plate so that said stylus tip is substantially centered within the field of view of said microscope objective.

3. A method as recited in claim 1 wherein said surface of said plate has two raised ledges thereon intersecting at a vertex centered within the field of view of said microscope objective, and wherein said moving step is performed by moving said cartridge substantially parallel to said surface in a manner such that the tip of said stylus meets one of said raised ledges and slides therealong toward said vertex until stopped thereat.

4. A method as recited in claim 3 wherein said placing step is performed by:
supporting said cartridge on a platform in a manner such that said stylus is located adjacent the surface of said prepositioned plate, and
lowering said arm until the tip of said stylus contacts said surface.

5. A method as recited in claim 4 wherein the step of moving said cartridge is performed by:
shoving said cartridge laterally along a first direction, and
pushing said cartridge forward along a second direction substantially orthogonal to said first direction.

6. A method as recited in claim 5 wherein said prepositioned plate comprises a relatively thin cover glass attached to said platform in a manner such that the position of said plate relative to said platform may be adjusted.

7. A method as recited in claim 5 wherein said shoving step is performed by a sliding cam lever having an edge, with an inclined step, oriented substantially along said second direction and disposed adjacent a roller connected to means for guiding said roller along said second direction, and having the edge opposite said stepped edge disposed adjacent a pin adapted to contact one side of said cartridge and shove said cartridge laterally, when said roller moves forward along said second direction adjacent said inclined step and causes said cam lever to turn, thereby moving said pin along said first direction.

8. A method as recited in claim 7 wherein said guiding means comprises a rack bar, adapted to move within a groove disposed along said second direction, said bar having one end thereof connected to an axle on which said roller rotates, and having a second end thereof attached to a piston rod of an air cylinder.

9. A method as recited in claim 5 wherein said pushing step is performed by a cam lobe attached to a shaft oriented along said first direction and connected to means for rotating said shaft, said cam lobe adapted to contact one end of said cartridge and push said cartridge forward when said shaft is rotated within a housing.

10. A method as recited in claim 9 further comprising the step of holding the one end of said cartridge against said cam lobe by means of a spring lever having one end thereof attached to said platform and the other end thereof adapted to contact the end of said cartridge opposite said one end.

11. A method as recited in claim 9 wherein said rotating means comprises a pinion affixed to said shaft and geared to said rack bar, whereby movement of said rack bar within said groove causes said pinion and shaft to rotate.

12. A method as recited in claim 11 wherein the step of lowering said arm is performed by a mechanical depressor having one end thereof rotably mounted on said shaft in a manner such that, upon rotation thereof, the opposite end of said depressor contacts and lowers a clamping spring adjacent said arm, said depressor being affixed to a first torque arm attached by a torque spring to a second torque arm affixed to said shaft, so that the rotation of said shaft causes said depressor to rotate, said torque spring allowing said shaft to continue rotating after said depressor has lowered said clamping spring and become stationary.

13. An apparatus for positioning the tip of a stylus mounted on an arm attached to a cartridge for viewing through a microscope, said arm being capable of flexible movement with respect to said cartridge, comprising a platform having a transparent plate attached thereto, said platform adapted to support said cartridge so that the tip of said stylus contacts a surface of said plate disposed between said tip and an objective of said microscope, said plate being prepositioned such that said surface lies in the focal plane of said microscope objective.

14. An apparatus as defined in claim 13 further comprising means attached to said platform for moving the tip of said stylus in a direction along the surface of said plate so that said stylus tip is substantially centered within the field of view of said microscope objective.

15. An apparatus as defined in claim 14 having means attached to said plate for guiding said tip toward a vertex centered within the field of view of said microscope objective.

16. An apparatus as defined in claim 15 wherein said guiding means comprises the surface of said plate having two raised ledges thereon intersecting at said vertex, and wherein said moving means comprises means for moving said cartridge substantially parallel to said surface in a manner such that said tip meets one of said raised ledges and slides therealong toward said vertex until stopped thereat.

17. An apparatus as defined in claim 16 wherein said prepositioned plate comprises a relatively thin cover glass attached to said platform in a manner such that the position of said plate relative to said platform may be adjusted.

18. An apparatus as defined in claim 16 wherein said means for moving said cartridge comprises:
means for shoving said cartridge laterally along a first direction, and
means for pushing said cartridge forward along a second direction substantially orthogonal to said first direction.

19. An apparatus as defined in claim 18 wherein said shoving means comprises a sliding cam lever having an edge, with an inclined step, oriented substantially along said second direction and disposed adjacent a roller connected to means for guiding said roller along said second direction, and having the edge opposite said stepped edge disposed adjacent a pin adapted to contact one side of said cartridge and shove said cartridge laterally, when said roller moves forward along said second direction adjacent said inclined step and causes said cam lever to turn, thereby moving said pin along said first direction.

20. An apparatus as defined in claim 19 wherein said guiding means comprises a rack bar, adapted to move within a groove disposed along said second direction, said bar having one end thereof connected to an axle on which said roller rotates, and having a second end thereof attached to a piston rod of an air cylinder.

21. An apparatus as defined in claim 18 wherein said pushing means comprises a cam lobe attached to a shaft oriented along said first direction and connected to means for rotating said shaft, said cam lobe adapted to contact one end of said cartridge and push said cartridge forward when said shaft is rotated within a housing.

22. An apparatus as defined in claim 21 further comprising a spring lever having one end thereof attached to said platform and the other end thereof adapted to contact the end of said cartridge opposite said one end and thereby hold the one end of said cartridge against said cam lobe.

23. An apparatus as defined in claim 21 wherein said rotating means comprises a pinion affixed to said shaft and geared to said rack bar, whereby movement of said rack bar within said groove causes said pinion and shaft to rotate.

24. An apparatus as defined in claim 23 further comprising a mechanical depressor attached to said shaft and adapted to lower a clamping spring adjacent said arm, to allow the tip of said stylus to contact said surface.

25. An apparatus as defined in claim 24 wherein one end of said mechanical depressor is rotatably mounted on said shaft in a manner such that, upon rotation thereof the opposite end of said depressor contacts and lowers said clamping spring, said depressor being affixed to a first torque arm attached by a torque spring to a second torque arm affixed to said shaft, so that the rotation of said shaft causes said depressor to rotate, said torque spring allowing said shaft to continue rotating after said depressor has lowered said clamping spring and become stationary.

26. An apparatus as defined in claim 13 further comprising an index-matching liquid disposed between said plate and said microscope objective.

27. An apparatus as defined in claim 26 wherein said index-matching liquid comprises a drop of oil.

* * * * *